(12) United States Patent
Terrell et al.

(10) Patent No.: US 8,222,037 B2
(45) Date of Patent: Jul. 17, 2012

(54) SYSTEM AND METHOD FOR A LOCAL GAMER NETWORK

(75) Inventors: Scott Michael Terrell, La Mesa, CA (US); Thomas John Roberts, Alpine, CA (US)

(73) Assignee: Performance Designed Products LLC, Sherman Oaks, CA (US)

( * ) Notice: Subject to any disclaimer, the term of this patent is extended or adjusted under 35 U.S.C. 154(b) by 505 days.

(21) Appl. No.: 12/464,786

(22) Filed: May 12, 2009

(65) Prior Publication Data

US 2010/0292006 A1 Nov. 18, 2010

(51) Int. Cl.
*A63F 9/24* (2006.01)

(52) U.S. Cl. ........................................................ 436/36

(58) Field of Classification Search .................. 463/36
See application file for complete search history.

(56) References Cited

U.S. PATENT DOCUMENTS

| | | | | |
|---|---|---|---|---|
| 5,695,400 A * | 12/1997 | Fennell et al. | ................... | 463/42 |
| 5,820,463 A * | 10/1998 | O'Callaghan | ................... | 463/42 |
| 5,899,810 A * | 5/1999 | Smith | .............. | 463/42 |
| 6,012,096 A * | 1/2000 | Link et al. | ..................... | 709/233 |
| 6,042,477 A * | 3/2000 | Addink | .............. | 463/42 |
| 6,304,902 B1 * | 10/2001 | Black et al. | ................... | 709/223 |
| 6,475,090 B2 * | 11/2002 | Roelofs | .......................... | 463/42 |
| 7,244,181 B2 * | 7/2007 | Wang et al. | ..................... | 463/42 |
| 2002/0142843 A1 * | 10/2002 | Roelofs | .......................... | 463/42 |
| 2005/0125150 A1 * | 6/2005 | Wang et al. | ................... | 701/213 |
| 2006/0135258 A1 * | 6/2006 | Maheshwari et al. | .......... | 463/42 |
| 2008/0146890 A1 * | 6/2008 | LeBoeuf et al. | .............. | 600/300 |

* cited by examiner

*Primary Examiner* — Matthew W Such
*Assistant Examiner* — Robert Carpenter
(74) *Attorney, Agent, or Firm* — Sheppard Mullin Richter & Hampton LLP

(57) ABSTRACT

Various embodiments of the invention provides for systems and methods for multi-participant controller systems. Specifically, some embodiments of the invention enable two or more participants to take part in a multi-participant interactive software running on a computing system. In addition, some of these embodiments allow for multi-participant interactive software, such as a dance-oriented or music-based video game, to time-shift the scoring of inputs from each participant during an activity session.

36 Claims, 8 Drawing Sheets

SYSTEM AND METHOD FOR A LOCAL GAMER NETWORK

FIELD OF THE INVENTION

The present invention is directed toward network system and methods, and more particularly, various embodiments relate to local networking for multi-participant computer-related activities, such as video games.

DESCRIPTION OF THE RELATED ART

Multi-player, interactive video games typically allow two or more users, or players, to concurrently provide some form of input to a game in response to visual cues and feedback provided by way of audio and video content material. Commonly, the input is accomplished by use of a controller of one form or another. For example, a controller may be a hand-held controller that has input features, such as a plurality of buttons, analog joysticks, D-pad directional control and other user input devices, that provide a means for a gamer to input desired controls to the video game software. Another example of a controller that has gained some popularity in recent years is the dance pad, which includes switching mechanisms to accept input from the feet of a gamer who performs dance-like maneuvers on the pad. Generally, user input through one of these controllers affects the game activity on the video screen.

Controllers usually take on a diversity of forms based on the type of interactive video game currently being played. For instance, a controller might be configured as a joystick as is popular for flight simulator games, a steering wheel and pedal combination as is popular for driving games, and guitar or other musical instruments for interactive music-based games. For particular dance-oriented games, a player might utilize a dance pad configured with a plurality of pad buttons disposed upon it. Within such games, players stand on the dance pad and look at a video screen that prompts them to step on different sequences of pad buttons within a specific time interval. Because the prompts to press are synchronized with the music played in the game, players stepping on the different sequences of pad buttons often appear as if they are dancing as they play. Scoring is determined based on the timing of pad button presses relative to the prompts/cues displayed on the video screen. For example, if the pad button press is on time relative to its respective prompt, the maximum amount of points will be awarded to the player. However, if the player stepped on the pad button a number of milliseconds later or early, the score awarded is proportionally less.

Although modem game consoles, such as the XBOX 360™, the Playstation 3™, and the Wii™, and computer gaming systems support multiple players for interactive video games, such as the dance-oriented games and music-based games, such systems lack the support for more than 4-8 players playing a game at the same time on a given system. In situations where more than 4-8 players want to play a multi-player video game on such systems, there is a need for some form of networking between two or more systems with each system playing a separate copy of the game. For example, Playstation 3 supports up to 7 players when offline (i.e., not connected through an Internet game or networking to another Playstation), and XBOX 360 supports only up to 4 players on a given XBOX unit before requiring another XBOX unit be linked to it to support multiplayer support beyond 4 players.

Additionally, within typical multiplayer games, such as the dance-oriented games and music-based games, the number of players simultaneously participating during a given game session is limited by the need of each player to have their own view on the video screen. In music-based games, for example, each player is provided with a stream of game cues indicating what button combination the player should be inputting to the game controller at a specific time. Similarly, with regard to dance-oriented games, each player is provided with a stream of game cues indicating what pad button combination a player should be standing on at each particular moment. Usually these streams of game cues occupy a large portion of the video screen for each player, thereby limiting the number of players that can participate at a given time to around 2-4 players.

BRIEF SUMMARY OF EMBODIMENTS OF THE INVENTION

Various embodiments of the invention provide for systems and methods for multi-participant controller systems. Specifically, some embodiments of the invention enable two or more participants to take part in a multi-participant interactive software running on a computing system. In addition, some of these embodiments allow for multi-participant interactive software, such as a dance-oriented or music-based video game, to time-shift the scoring of inputs from each participant during an activity session.

According to one embodiment of the invention, a multi-participant controller system is provided. In accordance with this embodiment, the system comprises a controller module and a computing system that works in conjunction with a multi-participant interactive software, such as a video game. The controller module is associated to a participant and is configured to: receive an input sequence; assign an input timestamp for the input within the input sequence, wherein the input timestamp corresponds to a time of entry for the input; buffer the input sequence received at the controller module as an input dataset, wherein the input dataset includes the input timestamp of the input within the input sequence; and transmit the input dataset to the computing system. The computing system, on the other hand, is configured to communicate with the controller module, run a multi-participant interactive software, and receive datasets from a controller module to the computing system. The controller module is embedded into or disposed on exercise equipment. For instance, the controller module can be attached to a treadmill, an exercise cycle, a ski machine, and a row machine and provide performance feedback to the computing system running the multi-participant interactive software.

In some embodiments, the computing system may be a game system or a personal computing device (e.g., laptop, desktop, ultra-mobile PC, personal digital assistant). In addition, for some embodiments, the controller module is either embedded into a game controller or coupled to a game controller through an expansion port. Game controllers to which some embodiments of the current invention are applicable include a dance pad game controller, a musical-instrument game controller, a flight stick game controller, and a steering wheel game controller. Alternatively, for some embodiments, In other embodiment, the computing system is in wireless communication with the controller module. Further, within some such embodiments, the controller module comprises a transceiver configured for two-way wireless communication.

In further embodiments, the controller module is a plurality of controller modules, wherein the plurality comprises a first controller module configured to communicate with the computing system, and other controller modules configured to communicate with the computing system through the first controller module. In some such embodiments, the first controller module is configured for wireless communication with the computing system. In other such embodiments, the other controller modules are configured for wireless communication with the first controller module. In alternative embodiments, the controller module is a plurality of controller modules and each controller module is in direct communication with the computing system.

After reading this description one of ordinary skill in the art will understand and appreciate that the various modules and controllers described herein may use a wired connection in place of or in addition to a wireless connection. In such embodiments, the wired connection would facilitate real-time or near real-time communication between the various components of the invention.

Within some embodiments, the controller module is further configured to receive input cues from the multi-participant software. For some of these embodiments, a display disposed on the controller module displays the input cues.

In various embodiments, the controller module comprises a removable module housing a power supply that is a rechargeable battery. In some instances, such embodiments allow the controller module to be detached from the input portion of a controller, thereby allowing the input portion of the controller to remain in place while the controller module is recharged at a remote location. For such embodiments, the display may be a LCD or an OLED display.

In some embodiments, the information displayed includes a controller module identification, a participant name, a score, and a network identification. Within further embodiments, the controller module comprises a button configured to synchronize timing (e.g., controller module's clock 816 in FIG. 10) with the computing system and pair the controller module to the computing system.

The controller module in some embodiments may include a biosensor configured to sense a biological condition of the participant. Examples of such biosensors include a moisture sensor, a galvanometer, and a heart monitor. Further, the controller module for other embodiments include a stimulus configured to receive an instruction from the computing system and to apply a sensory feedback, such as an electric shock, a change of temperature, or acoustical pressure, to the participant. Various embodiments may dispose the biosensor and/or the stimulus on such devices as a wristband, a body electrode, or a sensor attached to a finger or other appendage.

In particular embodiments, the controller module comprises a display disposed on the controller module configured to receive an instruction from the computing system and show information in accordance with the instruction received.

In accordance with this invention, some embodiments provide a method for multi-participant controller systems. In some such embodiments, the method comprises: receiving an input sequence at a controller module, wherein the controller module is associated to a participant on a multi-participant interactive software; assigning a first timestamp for the input within the input sequence, wherein the first timestamp corresponds to a time of entry for the input; and buffering the input sequence at the controller module as an input dataset, wherein the input dataset includes the first timestamp of the input within the input sequence, and wherein the operations of receiving the sequence of inputs, buffering the sequence of inputs, and assigning the timestamp, are performed before the input dataset is transmitted to a computing system running the multi-participant interactive software. Within various embodiments, the computing system is a game system. In further embodiments, the multi-participant interactive software is a video game and, particularly, a dance-oriented video game or a music-based video game.

In accordance with some embodiments, the method further comprises: transmitting the input dataset from the controller module to the computing system; receiving the input dataset at the computing system; and comparing at the computing system the input within the input dataset to the corresponding cue within a cue sequence based on the first timestamp and the second timestamp, wherein the second timestamp for the corresponding cue represents when the multi-participant interactive software displayed the corresponding cue.

In alternative embodiments, the method further comprises: receiving at the controller module from the computing system a cue dataset, the cue dataset including a cue sequence and a second timestamp for the cue within the cue sequence, wherein the second timestamp for the cue represents when the multi-participant interactive software displayed the cue; comparing at the controller module the input within the input dataset to the corresponding cue within the cue sequence based on the first timestamp and the second timestamp; and transmitting results of the comparison from the controller module to the computing system.

Within certain embodiments, the method further comprises using the comparison of the first timestamp of the input against a second timestamp of the corresponding cue to determine at the computing system a score for the participant.

For some embodiments, the multi-participant interactive software takes successive turns in displaying a progress for each participant. Within further embodiments, the multi-participant interactive software displays a cue sequence that prompts each participant to enter a desired input sequence within a window of time.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

Embodiments of the present invention are directed toward systems and methods for networking for multi-participant activities, such as video games. Specifically, various embodiments in accordance with the invention allow multiple individuals to simultaneously participate in a group activity.

Before describing the invention in detail it is useful to describe a few example environments with which the invention can be implemented. One such example is that of a computing system, such as a gaming system, used by one or more participants, such as video game players (gamers), to participate in a group activity, such as playing a computer game or video game.

Figure 1:
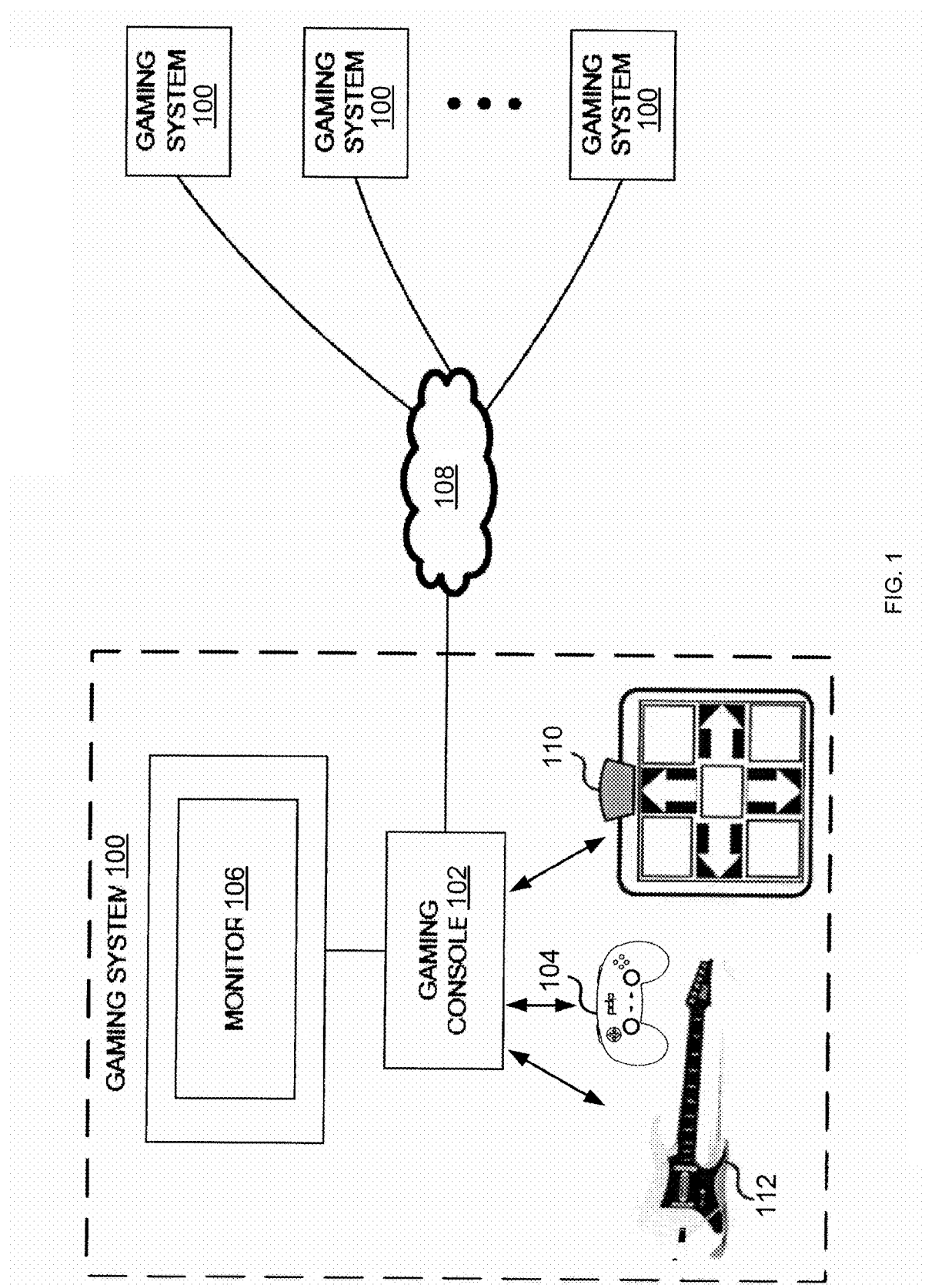
FIG. 1 is a block diagram illustrating a generalized version of a gaming system as one example of an environment with which the invention can be implemented.

FIG. 1 is a block diagram illustrating a generalized version of a gaming system 100 as one example of an environment with which the invention can be implemented. Referring now to FIG. 1, the example gaming system includes a gaming console 102, a monitor 106, a dance pad game controller 110, and a musical-instrument game controller 112. Both dance pad game controller 110 and musical-instrument game controller 112 are in this example in addition to traditional game controller 104. The illustrated example also includes an interface to a communication medium or communication network 108 such as, for example, the Internet or other communication channel.

In one environment, gaming console 102 might be implemented as a PlayStation®, Xbox 360®, Wii® or other like gaming console. In another implementation, gaming console 102 might be implemented as a personal computer or other like computing device. A gaming console 102 would typically include a processor or other computing device providing the ability to allow gaming applications, which are typically software applications, to be run thereon. A gaming application might be installed, for example, through the use of CD ROM drives, DVD drives, or other storage medium or communications interfaces. Typically, a gaming console 102 can be analogized to a computer or computing system to run the gaming software. In another environment, the gaming console 102 might be implemented as a personal computer.

A monitor 106 is typically provided to allow the gaming environment to be displayed to the gamer during game play. Monitor 106 can also be used to display menus and other features to the gamer to enhance the game play environment. Various interfaces might be provided between gaming console 102 and monitor 106 to provide the proper video signal to drive monitor 106. For example, RGB, NTSC, VGA, and other signal types or specifications can be used to provide communications between gaming console 102 and monitor 106. In the alternative, a video projector or other viewing mechanism (not shown) can be utilized in place of the monitor 106 to provide similarity display functionality.

Although not illustrated, speakers can also be provided, separately or with monitor 106, to provide audible information to the gamer during game play and during set up. For example, in one embodiment, monitor 106 might be implemented as a television with built in speakers that is connected to the gaming console via a coaxial or other audio and video input.

Also illustrated in the example environment is gaming controller 104 that can be used to allow gamers to provide input to the game software as well as to receive feedback from the game software during set up and game play. As described in the background section, controller 104 can include, for example, X, Y, A, B buttons, trigger buttons, analog joysticks, key pads, and other devices to allow the user to provide input to the game. Thus by actuating the various buttons, switches or joysticks, the gamer can control the operation of the game or control characters or vehicles in the game. The interface between gaming console 102 and controller 104, dance pad game controller 110, and musical-instrument game controller 112 might be either wired and/or wireless interfaces as may be desired. Likewise, throughout this document, references to communication or signal interfaces can be implemented using wired or wireless interfaces, unless otherwise specified.

Also illustrated in the example of FIG. 1 is a communications connection to a network 108. For example, a user may wish to connect the gaming console 102 to the internet or other communication medium whereby game information can be downloaded or uploaded to various websites, online services such as Xbox Live™, or other entities or services. Also, through a communication medium 108, gamers might compete amongst other gamers at their gaming systems 100, even if such other gamers at remote or distant locations. Note that depending on the gaming environment, remote gaming systems 100 might or might not have similar configurations to one another.

Although not depicted, game system 100 can have feedback devices, or stimulus, that can be used to provide sensory feedback from the gaming console to the user. The game system 100 can also have biosensors allowing for bioinformation (e.g., biometrics) regarding the user to provided to the console. Both the biosensors and feedback devices can communicate to the gaming console 102 via a separate communication path from the controllers 104, 110, and 112. For example, feedback devices can communicate through the USB ports or like communication ports as those found on gaming consoles such as the XBOX 360®, PlayStation® and personal computing system. Biosensors and feedback devices can also be configured to connect through ports of handheld gaming consoles 102, often referred to as expansion ports. As a further example, biosensors and feedback devices can communicate with gaming consoles 102 via wireless communication interfaces.

In yet another embodiment, feedback devices and biosensors can communicate with the gaming console via a communication path through the gaming controller 104. For example, the communication controller can be equipped with another communication interface and the biosensors, feedback devices, or both are communicatively coupled (whether hard wired or wirelessly) to the gaming controller 104. As one specific example of this case, a biosensor and feedback device can be configured for communicative coupling to a Wii® controller via the Wii controller's Wii® Nunchuck pass-through port. As these examples serve to illustrate, there are a number of mechanisms by which a biosensor or feedback device can be interfaced to a controller or to the gaming console.

Figure 2:
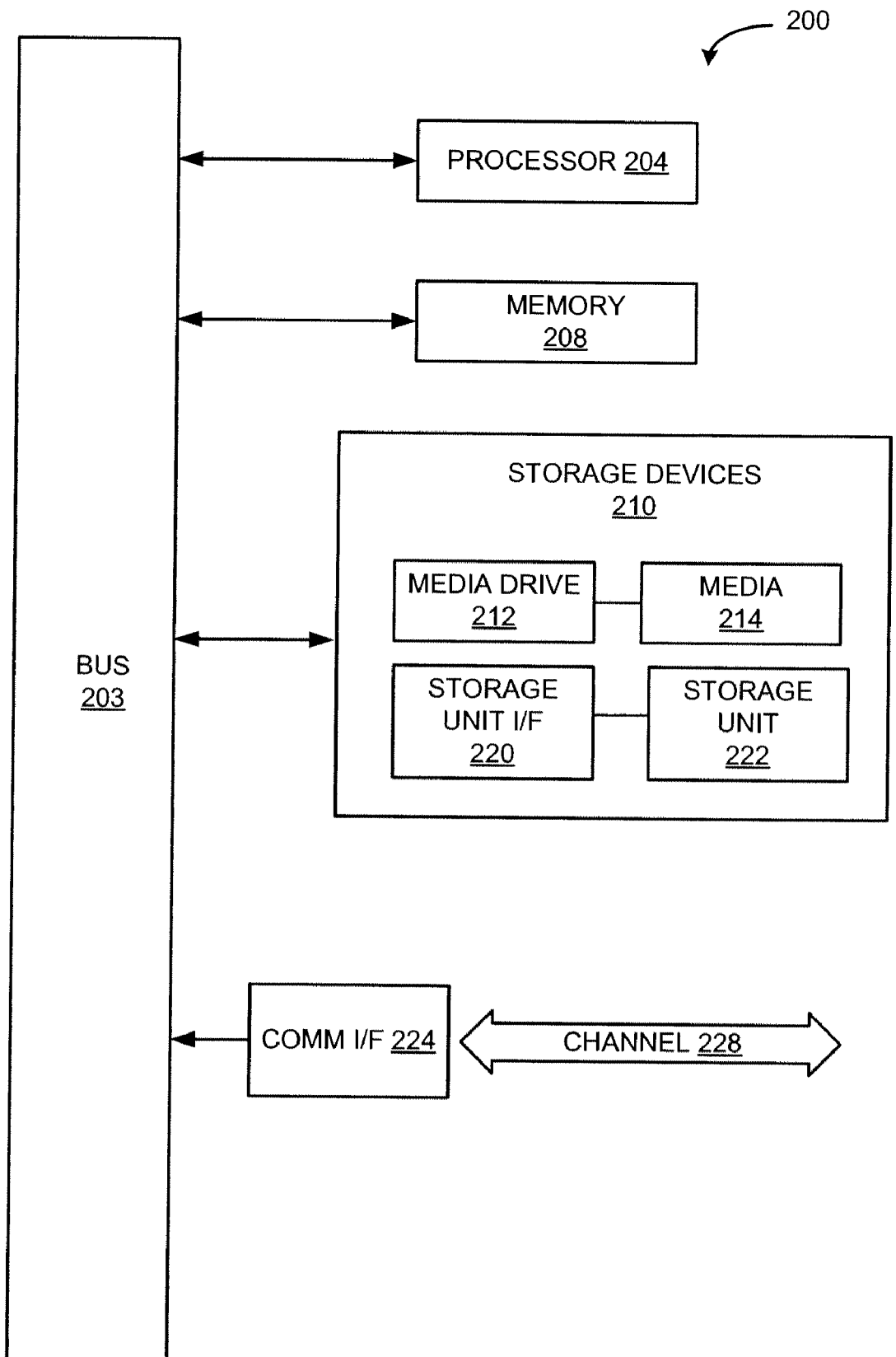
FIG. 2 is a diagram illustrating a computing system that can be used in conjunction with the systems and methods described herein.

Other example environments include computer systems, such as the one as illustrated in FIG. 2. Referring now to FIG. 2, computing module 200 may represent, for example, computing or processing capabilities found within desktop, laptop and notebook computers; hand-held computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 200 might also represent computing capabilities embedded within or otherwise available to game systems, such as one illustrated in FIG. 1. Such a computing module may, for example, be found in other electronic devices such as, for example, digital cameras, navigation systems, cellular telephones, portable computing devices, modems, routers, WAPs, terminals and other electronic devices that might include some form of processing capability.

Computing module 200 might include, for example, one or more processors, controllers, control modules, or other processing devices, such as a processor 204. Processor 204 might be implemented using a general-purpose or special-purpose processing engine such as, for example, a microprocessor, controller, or other control logic. In the example illustrated in FIG. 2, processor 204 is connected to a bus 203, although any communication medium can be used to facilitate interaction with other components of computing module 200 or to communicate externally.

Computing module 200 might also include one or more memory modules, simply referred to herein as main memory 208. For example, preferably random access memory (RAM) or other dynamic memory, might be used for storing information and instructions to be executed by processor 204. Main memory 208 might also be used for storing temporary variables or other intermediate information during execution of instructions to be executed by processor 204. Computing module 200 might likewise include a read only memory ("ROM") or other static storage device coupled to bus 203 for storing static information and instructions for processor 204.

The computing module 200 might also include one or more various forms of information storage mechanism 210, which might include, for example, a media drive 212 and a storage unit interface 220. The media drive 212 might include a drive or other mechanism to support fixed or removable storage media 214. For example, a hard disk drive, a floppy disk drive, a magnetic tape drive, an optical disk drive, a CD or DVD drive (R or RW), or other removable or fixed media drive might be provided. Accordingly, storage media 214, might include, for example, a hard disk, a floppy disk, magnetic tape, cartridge, optical disk, a CD or DVD, or other fixed or removable medium that is read by, written to or accessed by media drive 212. As these examples illustrate, the storage media 214 can include a computer usable storage medium having stored therein computer software or data.

In alternative embodiments, information storage mechanism 210 might include other similar instrumentalities for allowing computer programs or other instructions or data to be loaded into computing module 200. Such instrumentalities might include, for example, a fixed or removable storage unit 222 and an interface 220. Examples of such storage units 222 and interfaces 220 can include a program cartridge and cartridge interface, a removable memory (for example, a flash memory or other removable memory module) and memory slot, a PCMCIA slot and card, and other fixed or removable storage units 222 and interfaces 220 that allow software and data to be transferred from the storage unit 222 to computing module 200.

Computing module 200 might also include a communications interface 224. Communications interface 224 might be used to allow software and data to be transferred between computing module 200 and external devices. Examples of communications interface 224 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 224 might typically be carried on signals, which can be electronic, electromagnetic (which includes optical) or other signals capable of being exchanged by a given communications interface 224. These signals might be provided to communications interface 224 via a channel 228. This channel 228 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 208, storage unit 220, media 214, and signals on channel 228. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 200 to perform features or functions of the present invention as discussed herein.

Where components or modules of the invention are implemented in whole or in part using software, in one embodiment, these software elements can be implemented to operate with a computing or processing module such as computing module 200, which is capable of carrying out the functionality described with respect thereto. After reading this description, it will become apparent to a person skilled in the relevant art how to implement the invention using other computing modules or architectures.

From time-to-time, the present invention is described herein in terms of these example environments. Description in terms of these environments is provided to allow the various features and embodiments of the invention to be portrayed in the context of an exemplary application. After reading this description, it will become apparent to one of ordinary skill in the art how the invention can be implemented in different and alternative environments.

Figure 3:
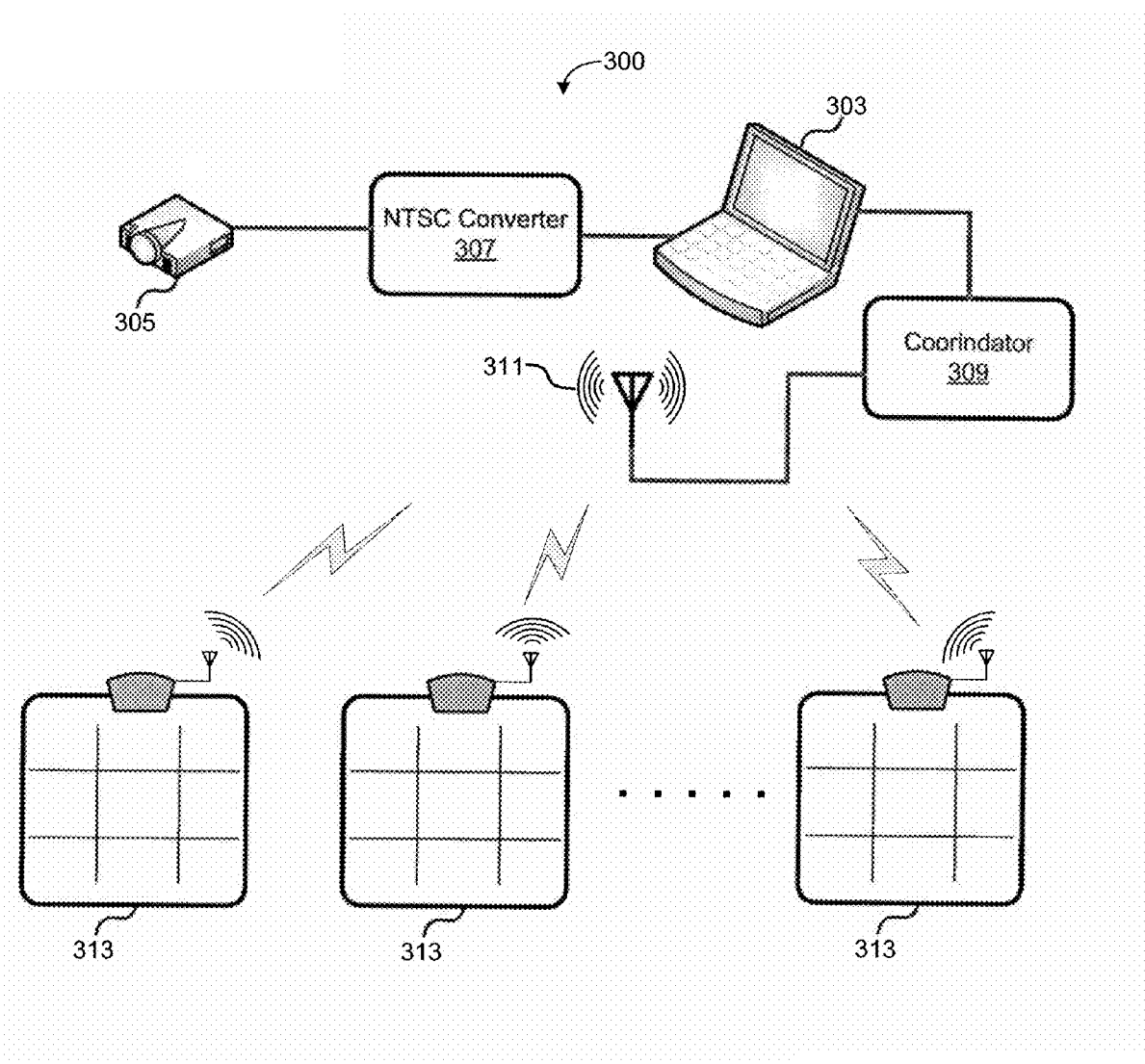
FIG. 3 is a diagram illustrating an example embodiment in accordance with the present invention.

Referring now to embodiments of inventions, FIG. 3 is a diagram illustrating an example embodiment in accordance with the present invention. For this particular embodiment 300, the invention is implemented as a multi-participant controller system used in conjunction with a computer system 303 (e.g., laptop, desktop or other computer). The controller system in this example comprises the coordinator 309, an antenna 311, and wireless dance-oriented game controllers 313. The computer 303 runs the multi-participant software, such as a multi-player video game, in which multiple individuals participate through their respective controllers 313. In this particular instance, the computer 303 outputs the dance-oriented video game to a projector 305 vis-à-vis an NTSC video converter 307.

Although the coordinator 309 is illustrated as a separate component/module from computer 303, in some embodiments, the coordinator 309 may exist on computer 303, and is implemented using hardware and/or software on the computer 303. In further embodiments, the antenna 311 may also exist as a component of computer 303.

The coordinator 309 is interfaced with computer 303 and equipped with an RF interface (not illustrated) and antenna 311 that allows it to communicate with the controllers 313 wirelessly. Depending on the embodiment, the wireless communication can be implemented by way of a number different radio frequency technologies and protocols, including, for example, Bluetooth®, Wireless USB, WiFi, Zigbee®, IEEE 802.11x, and the like. Particular wireless technologies utilized may use such radio-based multiple access technologies such as orthogonal frequency division multiplexing (OFDM), time-division multiple access (TDMA), code division multiple access (CDMA), frequency division multiple access (FDMA). For the particular controller system embodiment depicted in FIG. 3, each controller 313 individually communicates with coordinator 309 via antenna 311. Although this example uses wireless RF communications, other embodiments can be implemented that use hardwired communication links or wireless links at other frequencies.

Through these various technologies and combinations thereof, coordinator 309 is capable of, among other things, establishing a connection between the coordinator 309 and controllers 313, pairing the controllers 313 to the coordinator 309, assigning a unique identification to each of the controllers 313, and synchronizing timing between the coordinator 309 and the controllers 313. In order to provide these capabilities, an example coordinator may be equipped with a processor capable of executing software code to implement functions in accordance with the invention; a radio-frequency (RF) transceiver to enable wireless communication with the controllers 313, computer 303, or both; a communication port (e.g., USB, IEEE 1394—Firewire, RS323 serial port, etc.) to interface with computer 303; and a network processor that assists in establishing a wireless connection with controllers 313, pairing the coordinator to the controllers 313, and assign a unique identification to each of the controllers 313.

Figure 4:
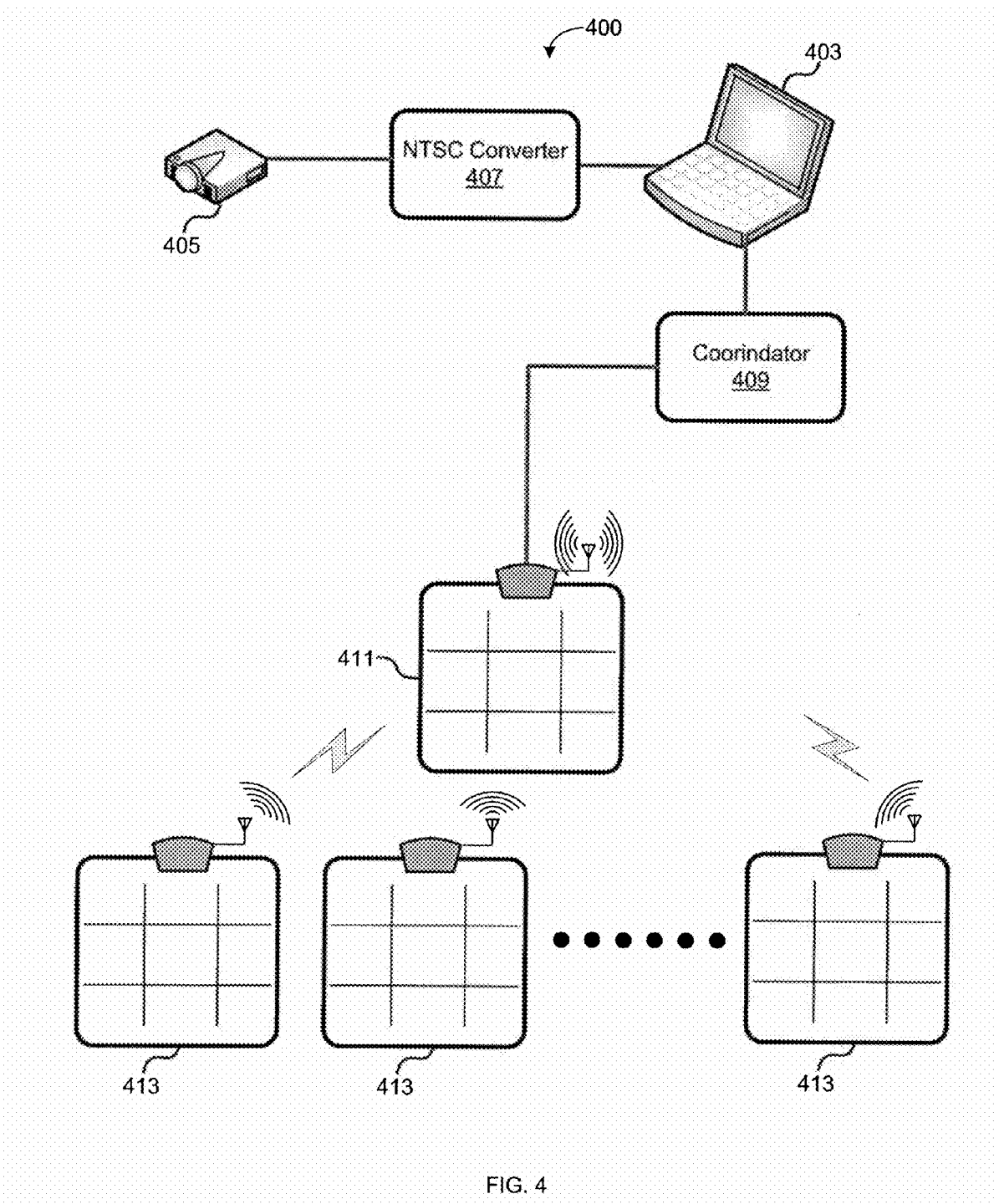
FIG. 4 is a diagram illustrating an example embodiment in accordance with the present invention.

FIG. 4 is a diagram illustrating an example embodiment 400 similar to that of FIG. 3. FIG. 4, like FIG. 3, illustrates wireless dance-oriented controllers 413, a computer 403 interfaced to a coordinator 409, and a computer 403 interfaced to a NTSC converter 407 which outputs to a projector 405. However, unlike FIG. 3, FIG. 4 depicts a central dance-oriented controller 411 as an access point, through which controllers 413 communicate with coordinator 409. The embodiment depicted illustrates a star-based network topology for the controllers, where controller 411 functions as the central node, and the controllers 413 (children controllers) operate as children nodes. Additionally, to ensure faster communication between the central controller 411 and coordinator 409, the central controller 411 in this example is interfaced directly to coordinator to 409 through a wired communication interface, such as a USB, Firewire, RS232 serial, or other hardwired interface. For certain embodiments, the faster communication allows input data from the central controller 411 to be transferred to the coordinator 409 in real-time, while input data from the various child controllers 413 is transferred to the coordinator 409 through the central controller 411 at a slightly slower rate than real-time. By using such a configuration, embodiments similar to the one depicted allow for a large number of multi-participant controllers to participate in video games that impose strict timing constraints on input data, like dance-oriented and music-based games. Further details regarding example implementation of this functionality is provided with respect to the example methods described in FIGS. 7 and 8.

Figure 5:
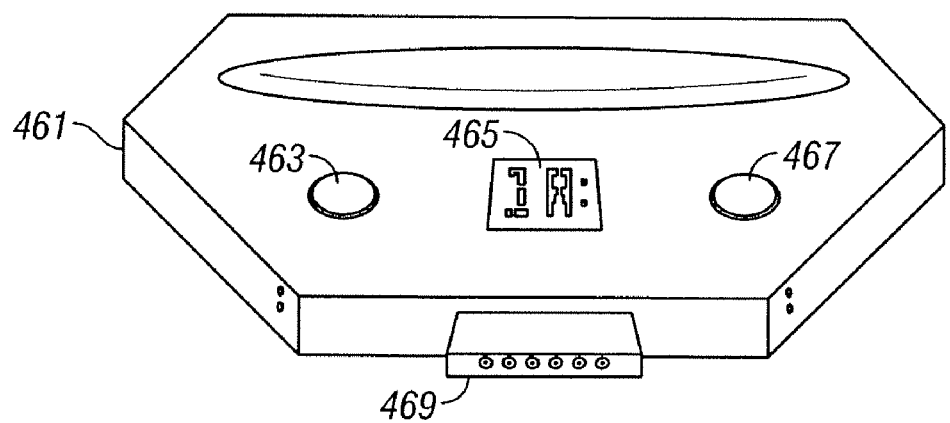
FIG. 5 is an example controller module in accordance with one embodiment of the present invention.
Figure 6:
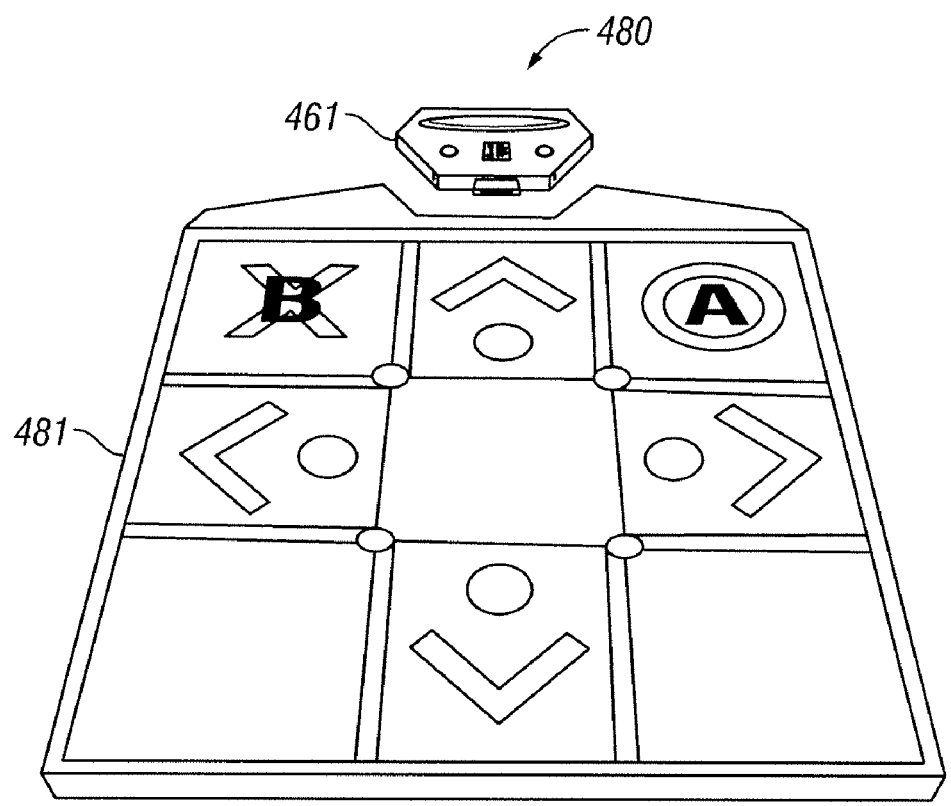
FIG. 6 is an example controller module in accordance with one embodiment of the present invention in conjunction with a compatible dance-related game controller.

FIG. 5 is a diagram illustrating an example control module that can be included with the controllers to facilitate communications with the coordination module. FIG. 6 is a diagram illustrating an example of a dance pad controller in conjunction with a control module. Turning now to FIGS. 5 and 6, both the controller module 461 and dance pad game controller 481 are examples of controllers that are functional with embodiments of the current invention. Additional controllers compatible with the current invention may include other dance-oriented game controllers, music-based game controllers, such as a guitar controller 112 and a drum game controller (not illustrated); flight stick game controllers; steering wheel game controllers and other system controllers useful for multi-participant games or activities. After reading the present description of the invention, it will be well appreciated by those of ordinary skill in the art that a vast variety of game controllers or other activity controllers could be applicable and compatible to the invention currently described. Game controllers used in conjunction with the present invention allow a large number of participants to simultaneously interact with a video game running on a computing system, such as a video console or a computer system. In one embodiment, the number of participants can be specified based on the number of participants for an anticipated application. For example, for classroom activities, an embodiment can be specified to support up to 64 controllers/users in the systems. Other embodiments can be configured to support fewer or greater numbers of users. In determining an upper bound for the number of controllers, the bandwidth of the communication link or the communication protocol can, in some applications, be a limiting factor. For example, the Bluetooth protocol currently limits the number of network connections to seven. Therefore, the desired number of users and the amount of data transferred between the controllers and the coordinator should be considered when specifying an application of the system.

In some alternative embodiments, the game controller may be replaced by, integrated into or used in conjunction with a piece of exercise equipment, such as a treadmill, exercise cycle, rowing machine, or the like. In configurations such as these, the piece of exercise equipments functions as a controller through which individual participants may take part in the interactive, multi-participant software activity (e.g., video game or exercise software). For example, in such an embodiment, exercise equipment data and activity can be sent to the computing system as input to the system. As such, gamers or activity participants can be tracked relative to one another or compete against one another in various game or game-like scenarios provided by the software. Where the multi-participant software is an exercise software, the software may be configured to receive and track input in real time or near real time from two or more participants using their respective exercise machines. For example, participants can participate in a virtual race among one another with data from the exercise equipment serving as controller like input into the system. As a further example, participant data from the various equipment such as rpm data, strokes-per-minute, kilometers per hour, difficulty or resistance levels (e.g., virtual hill settings), watts generated and so on can be used to track performance and compare results. Accordingly, controller module 461 functionality can be included to enable the exercise equipment to communicate exercise data with the gaming or other computing system. Embodiments of the invention configured for game controllers or exercise equipment may be well suited for such example environments as gyms (e.g., fitness clubs), schools, arcades or other multi-participant facilities.

Continuing now with FIG. 5, the example controller module 461 depicted comprises a display 465, a power button 467, a synchronize/pair button 463, and I/O interface 469. Such controller modules may further comprise various components (e.g., processors, controllers, memory) to facilitate, among other things, wireless communication between the controller module 461 and a coordinator (e.g., 309, 409), and data relaying between a controller and a coordinator. Although controller module 461 is depicted as a removable unit, other embodiments provide controller module 461 as an integrated component of the controller.

For this particular embodiment, when the synchronize button 463 is pushed, the controller module synchronizes and pairs the controller module 461 with a controller coordinator (e.g., coordinator 309, 409) in accordance with this invention. Specifically, in some embodiments, the synchronize button 463 initiates establishment of a connection between controller module 461 and a coordinator (e.g., 409), and is followed by a request to the coordinator for a unique network identification (network ID). The controller module 463 is considered paired with the coordinator once a network ID is provided for the module. The pairing process may also include assignment of the controller module 461 to individuals on the multi-participant software. Upon a successful pairing between control module 461 and the coordinator, display 465 may output the network ID assigned to the controller module, or the name of the participant using the controller connected to the controller module.

The example controller module 461 depicted in FIGS. 5 and 6 is removable and configured to interface with a game controller such as dance pad game controller 481 depicted in FIG. 6. For some embodiments, the ability to remove the controller module from the game controller allows the controller to stay in place, while the controller module (e.g., 461) is removed and recharged at a remote location. This may be suitable where a number of dance-oriented game controllers, such as dance pad game controllers, are spread out in a large room. For example, the controller modules can be removed and returned to a base station for charging and storage overnight or between uses. In one embodiment, power generators such as, for example, electric generators, piezoelectric transducers, faraday generators, and the like can be included in the controller to convert mechanical energy imparted on the controller into electrical current to power the controller or controller module. As a further example, miniature faraday generators such as, for example MEMs faraday generators, can be disposed in the dance pad such that when the pad is displaced by dance activity, movement of the pad results in motion of magnets of the generators relative to their coils thereby resulting in the generation of electrical current. This current can be used to power the controller and control module as well as to charge their batteries.

In addition, in various embodiments a controller module can be configured to either reset between different participants, or associated and preset to a specific participant or set of participants that regularly use the same controller module. This, for example, allows for ease of configurability and participant setup from session to session. Additionally, the controller module may be further configured with a RFID reader or the like to discern the identity of the current participant using the module.

Embodiments of the invention may also include a multi-participant interactive software configured to store the score for a participant or participants associated with a controller module. These scores can carry over session to session or be stored for long term analysis. Depending on the embodiment, the score may be stored in a database that resides on the computing system. Subsequent to storage of the scores, such a database can be utilized for comparison of long term scoring for a given participant from session to session, comparison of different participants on different computing systems, or comparison between different participants on the same computing system. Storage of the scores may also provide the ability for participants to set and reach personal performance goals using the multi-participant interactive software.

In addition, in various embodiments a controller module can either be reset for use between different participants, or associated and preset with a specific participant or set of participants that regularly use the same controller module. In the latter configuration, embodiments of the invention may include a multi-participant interactive software configured to store the score for the associated participant or participants from session to session. The score may be stored in a database for all users scores that resides on the computing system. Subsequently to storage, such a database may be utilized for comparison of long term scoring for a given participant, or comparison of different participants on different computing systems or between different sessions.

Figure 7:
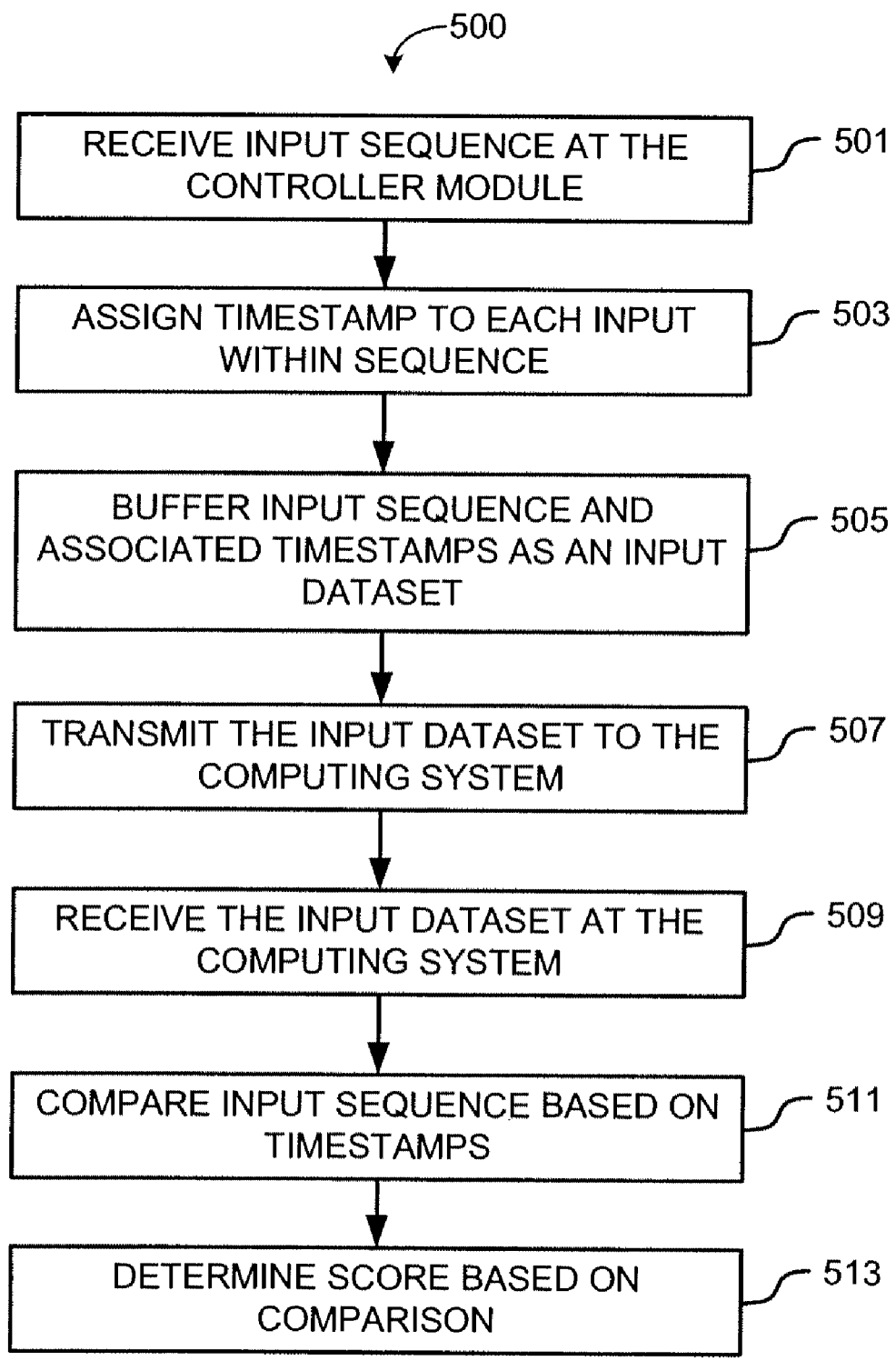
FIG. 7 is a flowchart illustrating an example method in accordance with one embodiment of the present invention.

With regard to FIG. 7, a flowchart is provided illustrating an example method 500, which enables particular features and functionalities of a controller system in accordance with certain embodiments of the invention. Beginning with operation 501, the method 500 receives an input sequence at a controller module (e.g., 461). As described above, the input data received by the controller module may originate from a variety of controllers to which the controller module is attached, including a game controller and an exercise machine. For example, with respect to a dance pad game controller, an input sequence comprising a sequence of dance pad button actuations on the dance pad game controller is received by its associated controller module. The sequence of dance pad button pushes is typically inputted, for example, by an individual "dancing" on the dance pad in response to the dance cues outputted by a dance-oriented video game.

Subsequently, in operation 503, the input within the input sequence is assigned a timestamp by the controller module, which then buffers the input sequence and corresponding timestamps into an input dataset. So, for example, with respect to the example of the dance pad game controller, as the controller module receives a sequence of dance pad button pushes (i.e., input sequence) from the dance pad game controller, the module assigns each dance pad button push with a timestamp corresponding to a time at which it was pushed. In particular embodiment of the invention, this is used in calculating the score of the individual participant.

At operation 507, method 500 transmits the input dataset generated to the computing system running the interactive multi-participant software. Depending on the embodiment, a data set may be transmitted through a wireless communication channel or a wired connection. Yet further embodiments, may wirelessly transmit the dataset to a master controller, which in turn relays it to the controller coordinator connected to the computing system, or transmit the dataset directly to the controller coordinator. This transmission may be continuous or periodic, depending on the wireless technology implemented. So, for instance, with regard to the dance pad game controller, under one configuration each dance pad game controller transmits a sequence of dance pad button presses as an input dataset (periodically or continuously) directly to a controller coordinator, which in turn relays it to the computing system running a dance-oriented game configured for multiple participants. In some embodiments, the communication channel between the controllers and the computing system or gaming system is shared such that not all of the controllers can communicate their data in real time. Accordingly, the time stamps can be used by the computing system to determine the temporal accuracy of the user inputs after the fact.

In some applications, one controller can be designated the master controller, and that master controller can be allowed to communicate with the computing system in real time, while inputs from the other controllers are timestamped, buffered and transferred as they are allocated bandwidth. Note that because the master controller is transmitting data in real time, the performance of the user of the master controller can be displayed on the gaming screen without undue latency. Therefore, that user and the other users can almost immediately see the results of the master. In other words, the display response in some embodiments can be similar to what a user would expect to experience with a single-player game on a gaming console. In some embodiments, the controller designated as the master controller, can rotate among the various controllers or a subset thereof, giving each user (or a subset of users) a chance to be the 'master' and to have his or her performance displayed on the screen.

Under other configurations, each dance pad game controller transmits a sequence of dance pad button presses as an input dataset (periodically or continuously) to a central dance pad controller (per the embodiment of FIG. 4), which is configured as an access point and which relays this data to the controller coordinator connected to a computing system running a dance-oriented game. Such configurations allow the central dance pad controller's inputs to be relayed to the controller coordinator at real-time rates, while inputs from "children" dance pad game controllers are relayed at almost real-time rates. Although only one access point is shown, embodiments are achievable wherein multiple access points can be provided. In one embodiment, the central controller can function as the master controller to achieve low latency as described above. Additionally, rotation can be achieved in such embodiments by allowing one of the child nodes to have its data transferred via the central node in real time or very near real time.

Figure 8:
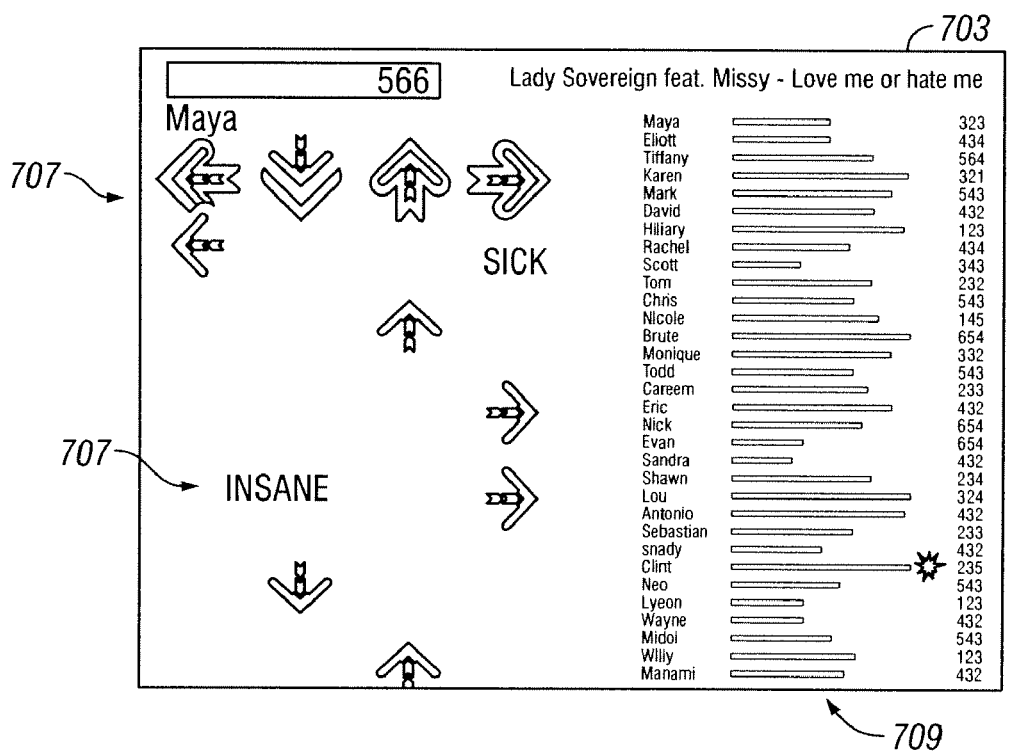
FIG. 8 is a screenshot of an example dance-related video game in accordance with one embodiment of the present invention.
Figure 9:
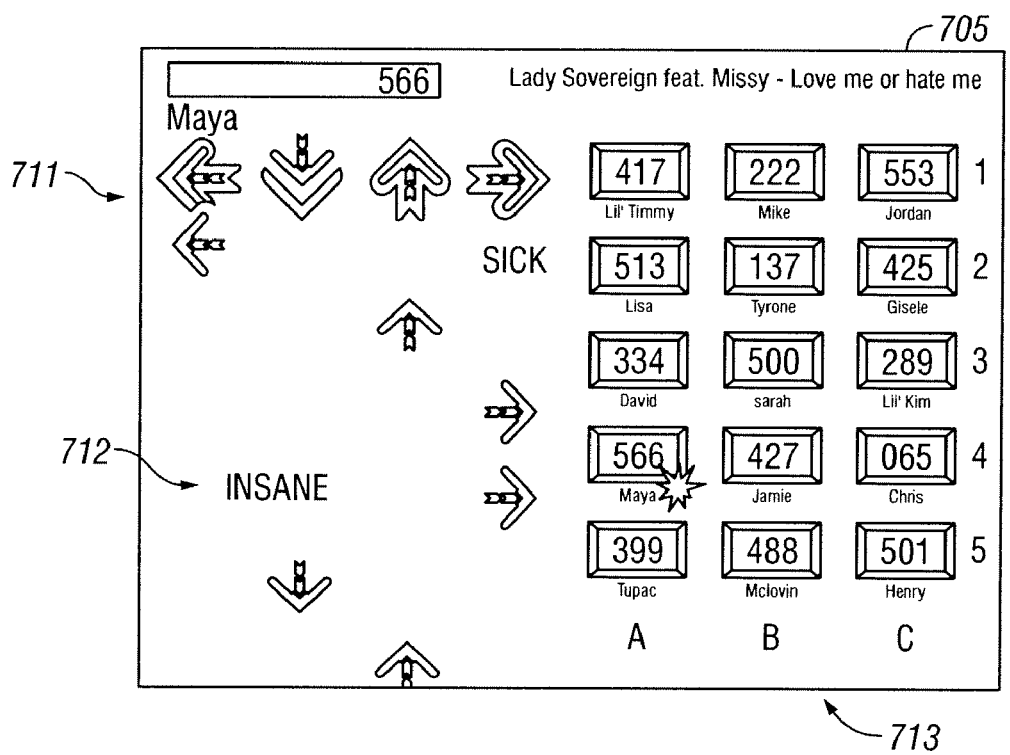
FIG. 9 is a screenshot of an example dance-related video game in accordance with one embodiment of the present invention.

At operation 509, the computing system running the multi-participant interactive software receives through a controller coordinator the input dataset transmitted from a controller (e.g., dance pad game controller). Then, at operation 511, the computing system compares the input sequence received from the controller against with the sequence that the multi-participant interactive software (running on the computing system) had prompted on the display. In some embodiments, the sequence prompted comprises a sequence of cues that indicate to each participant what input should be input at the given moment. For example, returning to the example of the dance-oriented game, the sequence prompted by the game may comprise symbols representing dance pad button pushes that indicate to each game participant what combination of button pushes should be inputted into the controller at a specified time. The symbols 707 and 711 illustrated in FIGS. 8 and 9 are just a few examples of what may be utilized by a dance-oriented game operating in accordance with an embodiment of the invention. FIGS. 8 and 9 provide example screenshots of a dance-oriented game in accordance with one embodiment of the invention. More with regard to FIGS. 8 and 9 is provided below.

For the embodiment illustrated in FIG. 7, the comparison of the input sequence received from the controller and the input sequence prompted/cued by the multi-participant interactive software is facilitated using the timestamp of each button press. In other words, the time at which a specific input is made to the controller (as recorded by the timestamp) is compared to the time at which the input was prompted/cued by the multi-participant interactive software on the display. Accordingly, scoring is determined based on the timing of input on the controller relative to the prompts/cues displayed on the display, and, in some gaming environments, points are awarded based on the temporal accuracy of the participant input on the controller relative to the prompt/cue displayed. After reading this description, one of ordinary skill in the art will appreciate that the window of time before and after a prompt/cue is displayed in which an input is accepted, compared and scored relative to that prompt/cue depends on the type of multi-participant interactive software. In addition, the unit of time in the timestamps used in either the input dataset from the controller, the prompt/cue sequence of the multi-participant interactive software, or both includes, but is not limited to, minutes, seconds, milliseconds, and nanoseconds. The unit of time suitable for a given multi-participant interactive software depends on the input timing requirements of the software.

For example, within some embodiments of dance-oriented games that operate in accordance with the present invention, milliseconds may be suitable for the timestamp because the shortest time between each prompted dance pad button press is approximately 250 ms. This also provides a 125 ms window of time before and after a given prompt for the participant to correctly input the prompted dance pad button press into the controller and to have it scored based on its correctness and timing relative to the prompt.

Note that in other applications, the timing of inputs may not be as critical as they can be in the example of a dance pad game or music game. In the case of a dance or music game, the user input is measured as a function of the input time relative to the prompt time. This is not always the case with gaming and activity events. For example, where users of exercise equipment participate in a group, the relative time sensitivity of their respective inputs may not be as critical. User performance data such as speed, miles traveled, energy, and so on can be aggregated, buffered and sent in allocated time slots and the display updated accordingly. In most of such applications, the typical latencies associated with the shared network connection should not have a deleterious effect on the gaming experience.

Method 500 concludes at operation 513, with the computing system determines the score associated with the particular controller from which the input dataset originated. In various embodiments, this score is then be accounted to the controller's existing score. In yet further embodiments, the multi-participant interactive software may also display affirmations or running commentary based on a given participants on the determined score.

Referring now to FIGS. 8 and 9, the example screenshots provided illustrate a dance-oriented game in accordance with one embodiment of the invention. In FIG. 8, screenshot 703 illustrates prompt symbols 707 representing the dance pad button pushes that each of the participants should be pressing at the given moment. The symbols below symbols 707 represent the sequence of dance pad button pushes or prompts that are next to come. As described previously with respect to method 500, some multi-participant interactive software in accordance with embodiments of the invention display commentary 707 on the screen based on the present performance, activity or score of the current participant being displayed. In some embodiments, the participant for which this information is displayed may be the participant operating the designated master controller. For example, the name of the user operating the master controller can be displayed as well as actual input data relative to the prompt data. Messages directed to this user can also be provided based on his or her performance. In embodiments where the master position rotates among controllers, this information can be rotated to the currently designated master controller and its identified user.

The scores in column 709 represent the currently calculated score for each participant of the multi-participant interactive software. This example illustrates a bar graph format where each user can gauge his or her performance relative to the other participants. Other display formats can be used.

In FIG. 9, screenshot 705 illustrates an alternative output from a dance-oriented game in accordance with one embodiment of the invention. Similar to FIG. 8, screenshot 705 displays symbols 711 and commentary 712. However, screenshot 705 illustrates a score column 713 in an alternative format. In some embodiments, the score of each participant may be displayed in score column 713 at a specified time interval. In further embodiments, the score displayed in score column 713 may be that of only the top scoring participant or top scoring group (e.g., top 10) or the score of the then current master controller participant.

Figure 10:
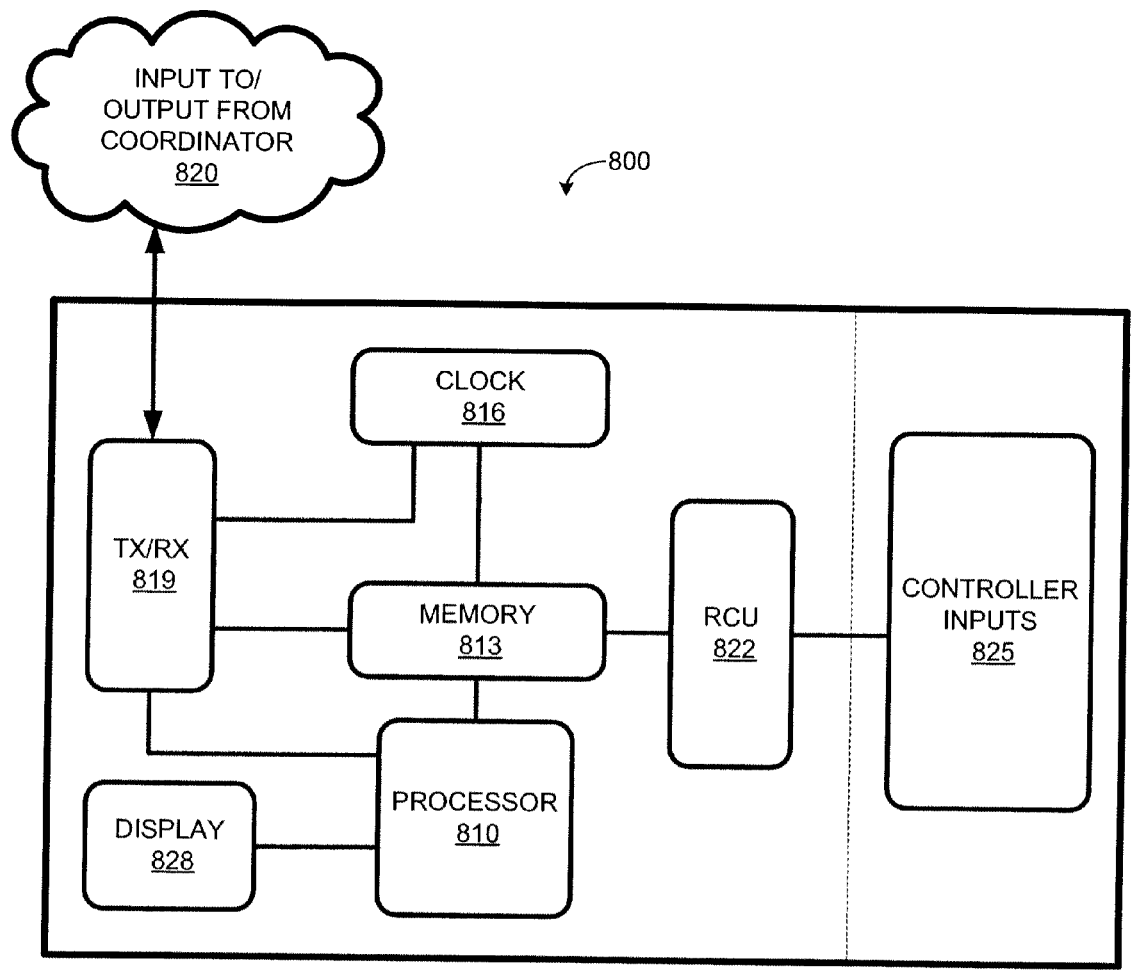
FIG. 10 is a diagram of an example architecture of a controller module in accordance with one embodiment of the present invention.

FIG. 10 is a diagram of an example architecture 800 for a controller module in accordance with one embodiment of the present invention. As illustrated, the architecture 800 comprises a processor 810 that aids in, among other things, the controller modules functionality in accordance with the present invention. The architecture further comprises a receiving control unit (RCU) 822 that receives data from the controller inputs 825, a memory 813 that may function as a buffer, a clock 816 that may be synchronized with the clock of the coordinator, and a transceiver 819 that facilitates communication 820 with the controller coordinator. The architecture 800 may also include a display 828 to operate in accordance with some of the features previously described herein. Additionally, after reading this description, one of ordinary skill in the art will appreciate that the architecture 800 as illustrated may be implemented entirely within a controller or, optionally, may be implemented with only the controller inputs 825 being embodied in the controller and the remaining components being implemented in a removable module that attaches to the controller.

As used herein, the term module might describe a given unit of functionality that can be performed in accordance with one or more embodiments of the present invention. As used herein, a module might be implemented utilizing any form of hardware, software, or a combination thereof. For example, one or more processors, controllers, ASICs, PLAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and fuinctionality described herein may be implemented in any given application and can be implemented in one or more separate or shared modules in various combinations and permutations. Even though various features or elements of functionality may be individually described or claimed as separate modules, one of ordinary skill in the art will understand that these features and fuinctionality can be shared among one or more common software and hardware elements, and such description shall not require or imply that separate hardware or software components are used to implement such features or fuinctionality.

While various embodiments of the present invention have been described above, it should be understood that they have been presented by way of example only, and not of limitation. Likewise, the various diagrams may depict an example architectural or other configuration for the invention, which is done to aid in understanding the features and fuinctionality that can be included in the invention. The invention is not restricted to the illustrated example architectures or configurations, but the desired features can be implemented using a variety of alternative architectures and configurations. Indeed, it will be apparent to one of skill in the art how alternative fuinctional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A multi-participant controller system configured to allow a plurality of input controllers to interface to a computing system running multi-participant interactive software, the controller system, comprising:
    a controller module comprising:
        a first interface, configured to be coupled to a controller input feature and configured to receive from the controller input feature a control input for the multi-participant interactive software, the control input generated in response to an action by a participant of the multi-participant interactive software;
        a second interface configured to be coupled to the computing system; and
        a processor coupled to the first interface and configured to:
            receive via the first interface a sequence of control inputs from the controller input feature;
            assign an input timestamp to a control input within the sequence of control inputs, wherein the input timestamp corresponds to a time of entry for the control input by the participant;
            generate a dataset comprising a set of control inputs received at the controller module and their respective timestamps assigned by the controller module; and
            transmit the generated dataset to the computing system by way of the second interface;
    wherein the computing system is configured to:
        communicate with the controller module,
        run the multi-participant interactive software, and
        receive generated datasets from the controller module.

2. The multi-participant controller system of claim 1, wherein the controller module is either embedded into a input controller or coupled to a game controller through an expansion port.

3. The multi-participant controller system of claim 1, wherein the controller module is embedded into or disposed on exercise equipment.

4. The multi-participant controller system of claim 3, wherein the exercise equipment comprises a treadmill, an exercise cycle, a ski machine, or a row machine.

5. The multi-participant controller system of claim 1, wherein the computing system is in wireless communication with the controller module.

6. The multi-participant controller system of claim 1, wherein the multi-participant interactive software is a video game.

7. The multi-participant controller system of claim 1, wherein the computing system includes a game system.

8. The multi-participant controller system of claim 1, wherein the controller module is a plurality of controller modules, the plurality comprising a first controller module configured to communicate with the computing system, and other controller modules configured to communicate with the computing system through the first controller module.

9. The multi-participant controller system of claim 8, wherein the first controller is configured for wireless communication with the computing system.

10. The multi-participant controller system of claim 8, wherein the other controller modules are configured for wireless communication with the first controller module.

11. The multi-participant controller system of claim 1, wherein the controller module is a plurality of controller modules and each controller module is in direct communication with the computing system.

12. The multi-participant controller system of claim 1, wherein the controller module comprises a transceiver configured for two-way wireless communication.

13. The multi-participant controller system of claim 1, wherein the controller module is further configured to receive input cues from the multi-participant software.

14. The multi-participant controller system of claim 13, wherein a display disposed on the controller module displays the input cues.

15. The multi-participant controller system of claim 1, wherein the controller module comprises a removable module housing a power supply that is a rechargeable battery.

16. The multi-participant controller system of claim 1, wherein the controller module comprises a display disposed on the controller module configured to receive an instruction from the computing system and show information in accordance with the instruction received.

17. The multi-participant controller system of claim 16, wherein the display is a liquid-crystal display or an organic light emitting diode display.

18. The multi-participant controller system of claim 16, wherein the information displayed includes a controller module identification, a participant name, a score, and a network identification.

19. The multi-participant controller system of claim 1, wherein the controller module comprises a button configured to synchronize timing with the computing system and pair the controller module to the computing system.

20. The multi-participant controller system of claim 1, wherein the input controller comprises a biosensor configured to sense a biological condition of the participant.

21. The multi-participant controller system of claim 20, wherein the biosensor is a moisture sensor, a galvanometer, or a heart monitor.

22. The mulit-participant controller system of claim 1, wherein the input controller comprises a stimulus configured to receive an instruction from the computing system and to apply a sensory feedback to the participant.

23. The multi-participant controller system of claim 22 wherein the sensory feedback is an electric shock, a change of temperature, or acoustical pressure.

24. The multi-participant controller system of claim 20, wherein the biosensor is disposed on a wristband, a body electrode, or a sensor attached to a finger or other appendage.

25. The multi-participant controller system of claim 22, wherein the stimulus is disposed on a wrist band, a body electrode, or a sensor attached to a finger or other appendage.

26. The multi-participant controller system of claim 2, wherein the input controller is a dance pad game controller, a musical-instrument game controller, a flight stick game controller, or a steering wheel game controller.

27. A method for multi-participant controller systems, comprising:
    receiving a sequence of control inputs at a controller module from a controller input feature, wherein the controller input feature is configured to receive from a participant a control input for a multi-participant interactive software, wherein the sequence of control inputs is entered by the participant through the controller input feature, wherein the sequence of control inputs include the control input, and wherein the controller module is associated with the participant on a multi-participant interactive software;

assigning, at the controller module, a first timestamp to the control input within the sequence of control inputs, wherein the first timestamp corresponds to a time of entry for the control input by the participant; and buffering the sequence of control inputs at the controller module as a control input dataset, wherein the control input dataset includes the first timestamp of the control input within the sequence of control inputs, and wherein the operations of receiving the sequence of control inputs, buffering the sequence of control inputs, and assigning the timestamp are performed before the control input dataset is transmitted to a computing system running the multi-participant interactive software.

28. The method of claim 27, wherein the computing system is a gaming console.

29. The method of claim 27, wherein the multi-participant interactive software is a video game.

30. The method of claim 27, further comprising:
transmitting the control input dataset from the controller module to the computing system;
receiving the control input dataset at the computing system; and
comparing at the computing system the control input within the control input dataset to the corresponding cue within a cue sequence based on the first timestamp and a second timestamp, wherein the second timestamp for the corresponding cue represents when the multi-participant interactive software displayed the corresponding cue.

31. The method of claim 30, further comprising:
determining at the computing system a score for the participant based on the comparison of the first timestamp of the control input against the second timestamp of the corresponding cue.

32. The method of claim 27, further comprising:
receiving at the controller module from the computing system a cue dataset, the cue dataset including a cue sequence and a second timestamp for the cue within the cue sequence, wherein the second timestamp for the cue represents when the multi-participant interactive software displayed the cue;
comparing at the controller module the control input within the control input dataset to the corresponding cue within the cue sequence based on the first timestamp and the second timestamp; and
transmitting results of the comparison from the controller module to the computing system.

33. The method of claim 32, further comprising:
determining at the computing system a score for the participant based on the comparison of the first timestamp of the control input against the second timestamp of the corresponding cue.

34. The method of claim 27, wherein the multi-participant interactive software takes successive turns in displaying a progress for each participant.

35. The method of claim 27, wherein the multi-participant interactive software displays a cue sequence that prompts each participant to enter a desired input sequence within a window of time.

36. The method of claim 29, wherein the video game is a dance-oriented video game or a music-based video game.

* * * * *